US009319975B2

(12) United States Patent
Ferraro Esparza et al.

(10) Patent No.: US 9,319,975 B2
(45) Date of Patent: Apr. 19, 2016

(54) DISTRIBUTED ACCESS NETWORK DISCOVERY AND SELECTION FUNCTION AND METHOD OF OPERATING THE SAME

(71) Applicant: TELEFONAKTIEBOLAGET L M ERICSSON (PUBL), Stockholm (SE)

(72) Inventors: Victor Ferraro Esparza, Valencia (ES); Jari Vikberg, Järna (SE); Gunnar Mildh, Sollentuna (SE); Samy Touati, Pleasanton, CA (US); Haseeb Akhtar, Garland, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 39 days.

(21) Appl. No.: 13/755,218

(22) Filed: Jan. 31, 2013

(65) Prior Publication Data

US 2014/0106743 A1    Apr. 17, 2014

Related U.S. Application Data

(60) Provisional application No. 61/712,630, filed on Oct. 11, 2012.

(51) Int. Cl.
*H04W 4/00* (2009.01)
*H04W 48/18* (2009.01)
(Continued)

(52) U.S. Cl.
CPC .............. *H04W 48/18* (2013.01); *H04W 48/08* (2013.01); *H04W 84/12* (2013.01); *H04W 88/06* (2013.01)

(58) Field of Classification Search
CPC ....... H04W 4/00; H04W 48/16; H04W 36/14; H04W 48/18; H04W 48/08; H04W 84/12; H04W 88/06; H04L 41/12; H04L 12/1407; H04L 12/5692

USPC ............. 455/426.1, 435.2, 444, 525; 370/254
See application file for complete search history.

(56) References Cited

U.S. PATENT DOCUMENTS 8,185,152 B1 *   5/2012   Goldner ...................... 455/552.1
2009/0274069 A1 * 11/2009  Olsson et al. ................. 370/255
(Continued)

FOREIGN PATENT DOCUMENTS

EP            2603046 A1    6/2013
FI    WO 2014/005654    *  7/2012   ............ H04W 48/08

OTHER PUBLICATIONS

Alcatel Lucent: "Wi-Fi Roaming—Building on ANDSF and Hotspot2.0", Internet Citation, Feb. 27, 2012, pp. 1-45, XP002677915; retrieved from the Internet: URL:http://www.alcatel-lucent.com [retrieved on Feb. 27, 2012], pp. 8, 31-33.
(Continued)

*Primary Examiner* — Mong-Thuy Tran

(57) ABSTRACT

A system and method is provided for performing an access network discovery and selection function in a communication system. An access network discovery and selection function ("ANDSF") server is operable with a Third Generation Partnership Project ("3GPP") radio access network and a Wireless Fidelity ("Wi-Fi") radio access network coupled to a core network. The ANDSF server is configured to communicate with a user equipment over an enhanced S14 interface. The enhanced S14 interface comprises Wi-Fi radio access technology data including a basis service set ("BSS") load indication, security information, quality of experience information, backhaul network bandwidth and average throughput. The ANDSF server is also configured to provide policy information to the user equipment based on conditions in the Wi-Fi radio access network and the 3GPP radio access network.

30 Claims, 9 Drawing Sheets

(51) Int. Cl.
*H04W 48/08* (2009.01)
*H04W 84/12* (2009.01)
*H04W 88/06* (2009.01)

(56) References Cited

U.S. PATENT DOCUMENTS

| | | | | |
|---|---|---|---|---|
| 2010/0003980 | A1* | 1/2010 | Rune et al. | 455/436 |
| 2011/0110300 | A1* | 5/2011 | Sachs et al. | 370/328 |
| 2012/0069749 | A1* | 3/2012 | Famolari | G06Q 30/02 370/252 |
| 2012/0259985 | A1* | 10/2012 | Koskela et al. | 709/227 |
| 2012/0324100 | A1* | 12/2012 | Tomici et al. | 709/224 |
| 2013/0041981 | A1* | 2/2013 | Kim et al. | 709/217 |
| 2013/0163424 | A1* | 6/2013 | Goerke | H04W 24/02 370/235 |
| 2013/0163463 | A1* | 6/2013 | Grayson | H04L 43/0876 370/253 |
| 2013/0170351 | A1* | 7/2013 | Reznik | H04W 28/10 370/235 |
| 2013/0242965 | A1* | 9/2013 | Horn et al. | 370/338 |
| 2013/0308445 | A1* | 11/2013 | Xiang et al. | 370/230 |
| 2013/0310030 | A1* | 11/2013 | Ventimiglia et al. | 455/434 |
| 2013/0322300 | A1* | 12/2013 | Landais et al. | 370/259 |
| 2014/0160994 | A1* | 6/2014 | Garcia Martin | H04W 48/16 370/259 |
| 2014/0226487 | A1* | 8/2014 | Forssell et al. | 370/235 |
| 2015/0172998 | A1* | 6/2015 | Tervonen | H04W 48/16 370/254 |
| 2015/0189547 | A1* | 7/2015 | Forssell | H04L 63/101 370/235 |

OTHER PUBLICATIONS

"Celluluar-Wi-Fi Integration Cellular-Wi-Fi White Paper," Jun. 30, 2012, XP055097153, retrieved from the Internet: URL:http://www.interdigital.com/wp-content/uploads/2012/08/Cellular_WiFi_Integration-White-Paper.pdf [retrieved on Jan. 20, 2014], pp. 15, 20.

Rbara Orlandi and Frank Scahill: "Improving QoE in Heterogeneous Networks," Internet citation, Sep. 17, 2012, pp. 1-6, XP002718285, retrieved from the Internet: URL:http://www2.alcatel-lucent.com/techzine/improving-qoe-in-heterogeneous-networks/ [retrieved on Jan. 2, 2014] the whole document.

* cited by examiner

DISTRIBUTED ACCESS NETWORK DISCOVERY AND SELECTION FUNCTION AND METHOD OF OPERATING THE SAME

CROSS-REFERENCE TO RELATED APPLICATION

This application claims the benefit of U.S. Provisional Application No. 61/712,630, entitled "Distributed ANDSF Implementation," filed on Oct. 11, 2012 which is incorporated herein by reference.

TECHNICAL FIELD

The present invention is directed, in general, to communication systems and, more particularly, a system and method for performing an access network discover and selection function in a communication system.

BACKGROUND

Mobile operators are experiencing very rapid increases in data traffic and require more sophisticated ways to handle high traffic volumes. Data offloading to non-Third Generation Partnership Project ("3GPP") access networks (e.g., to Wireless Fidelity ("Wi-Fi") access networks) is one way to reduce congestion in 3GPP access networks. It is not always appropriate, however, to move all the traffic in one direction. Rather, consideration should be given to the status of a target access network, a type of data, a subscription type, an application type and a condition of the access network.

The current access network discovery and selection function ("ANDSF") solution does not address a number of problems. For instance, the current ANDSF does not support an architecture where the ANDSF servers are distributed across mobile telephony switching office ("MTSO") locations within a radio access network ("RAN"). A MTSO typically is a central office ("CO") wherein multiple base stations (e.g. 300-1000 base stations) are aggregated before connecting to a core network ("CN"). The current solution also does not address the relationship between core network ANDSF ("CNA") servers and radio access network ANDSF ("RANA") servers. The current solution also does not address handover between RANA servers when a user equipment ("UE") traverses between two or more MTSOs.

Despite continued efforts, these limitations have now become substantial hindrances for efficient wide-scale deployment of mobile radio access technology. Accordingly, what is needed in the art is an approach that overcomes the deficiencies in the current systems and methods.

SUMMARY OF THE INVENTION

These and other problems are generally solved or circumvented, and technical advantages are generally achieved, by advantageous embodiments of the present invention, a system and method for performing an access network discovery and selection function in a communication system. An access network discovery and selection function ("ANDSF") server is operable with a Third Generation Partnership Project ("3GPP") radio access network and a Wireless Fidelity ("Wi-Fi") radio access network coupled to a core network. The ANDSF server is configured to communicate with a user equipment over an enhanced S14 interface. The enhanced S14 interface comprises Wi-Fi radio access technology data including a basis service set ("BSS") load indication, security information, quality of experience information, backhaul network bandwidth and average throughput. The ANDSF server is also configured to provide policy information to the user equipment based on conditions in the Wi-Fi radio access network and the 3GPP radio access network.

The foregoing has outlined rather broadly the features and technical advantages of the present invention in order that the detailed description of the invention that follows may be better understood. Additional features and advantages of the invention, will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different figures generally refer to corresponding parts unless otherwise indicated, and may not be redescribed in the interest of brevity after the first instance. The FIGURES are drawn to illustrate the relevant aspects of exemplary embodiments.

DETAILED DESCRIPTION OF ILLUSTRATIVE EMBODIMENTS

Figure 1:
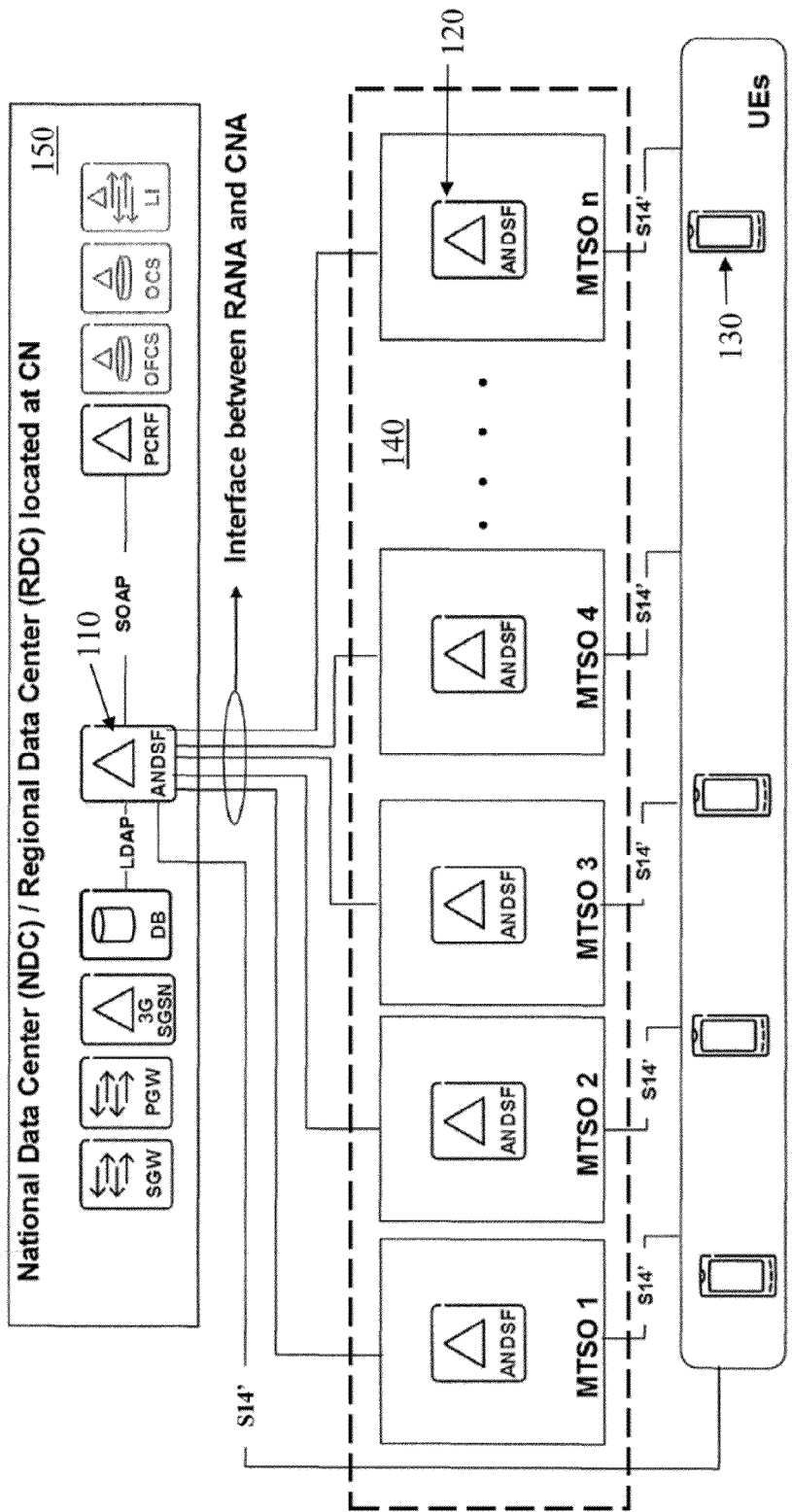
FIG. 1 illustrates a system level diagram showing an embodiment of high-level placement of access network discovery and selection function servers in a communication system.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules associated with an access network discovery and selection function ("ANDSF").

An access network discovery and selection function will be described with respect to exemplary embodiments in a specific context, namely, a system and method that includes a process for performing an access network discovery and selection function in, for instance, a user equipment operable with a Third Generation Partnership Project ("3GPP") radio access network and a Wireless Fidelity ("Wi-Fi") radio access network coupled to a core network, and a corresponding process operable in a server for performing an access network discovery and selection function. While the principles will be described in the environment of a cellular communication network, any environment that may benefit from such a system and method that enables performing an access network discovery and selection function is well within the broad scope of the present disclosure.

The ANDSF is an existing component that allows a user equipment ("UE") to choose an access network between a 3GPP telecommunications service and a Wi-Fi radio access technology ("RAT"). An ANDSF server and the user equipment communicate with each other so that the user equipment can download RAT selection policy rules defined by an operator. The ANDSF is a 3GPP-defined function (available since 3GPP Release-8, and continuing to evolve) that provides structure to send different policies to a user equipment for network discovery and selection. An example policy is to select a Wi-Fi RAT if the UE launches a video downloading application such as YouTube™, Netflix™, etc. Communication between the user equipment and an ANDSF server is defined by an Internet protocol-based S14-interface between the user equipment and the ANDSF server in a radio access network. A 3GPP S14 logical interface uses ANDSF elements for inter-technology network discovery and selection and for facilitating handover of a user equipment between radio access technologies. The S14 interface is described in 3GPP Technical Specification 24.312 V11.50, dated December, 2012, which is incorporated herein by reference. The S14 interface is an open mobile alliance-device management ("OMA-DM") interface that provides parameters for inter-system mobility as well as network discovery information to allow a user equipment to select an appropriate access network based on location, access identifiers, as well as applications.

Access discovery information is used to provide access discovery information to a user equipment, which can assist the user equipment to discover available 3GPP and non-3GPP access networks without the burden of continuous background scanning. Inter-system mobility policies ("ISMP") are policies that guide the user equipment to select the preferable 3GPP or non-3GPP access point. The ISRP are used for user equipment that access a single access (3GPP or Wi-Fi) at a time. Inter-system routing policies ("ISRP") are policies that guide the user equipment to select over which access point a certain type of traffic or a certain access point name ("APN") should be routed. The ISRP are used for user equipment that simultaneously access both 3GPP and Wi-Fi radio access networks.

Turning now to FIG. 1, illustrated is a system level diagram showing an embodiment of high-level placement of ANDSF servers in a communication system. As shown in FIG. 1, an ANDSF server is located within a CN 150 such as core network ANDSF ("CNA") server 110 and there are multiple radio access network ANDSF ("RANA") servers at the MTSOs (e.g., an ANDSF server 120 in MTSOn) in a RAN 140. Each RANA server 120 in the MTSOn has an enhanced S14' interface with user equipment, such as user equipment 130, in its respective serving area. The enhanced S14' interface indicates that additional information is added to the current S14 interface. The enhanced S14' interface allows more dynamic, frequent and efficient signaling over the interface. The additional information added to the enhanced S14' interface includes Wi-Fi RAT data (e.g., cell loading, backhaul bandwidth, operator's identification ("ID"), etc.) so that the CNA server 110 and RAN server 120 can make informed access selection between Wi-Fi and other 3GPP RATs.

Table 1 below lists, without limitation, Wi-Fi RAT data that can be sent by a user equipment to a RANA server 120.

Figure 2:
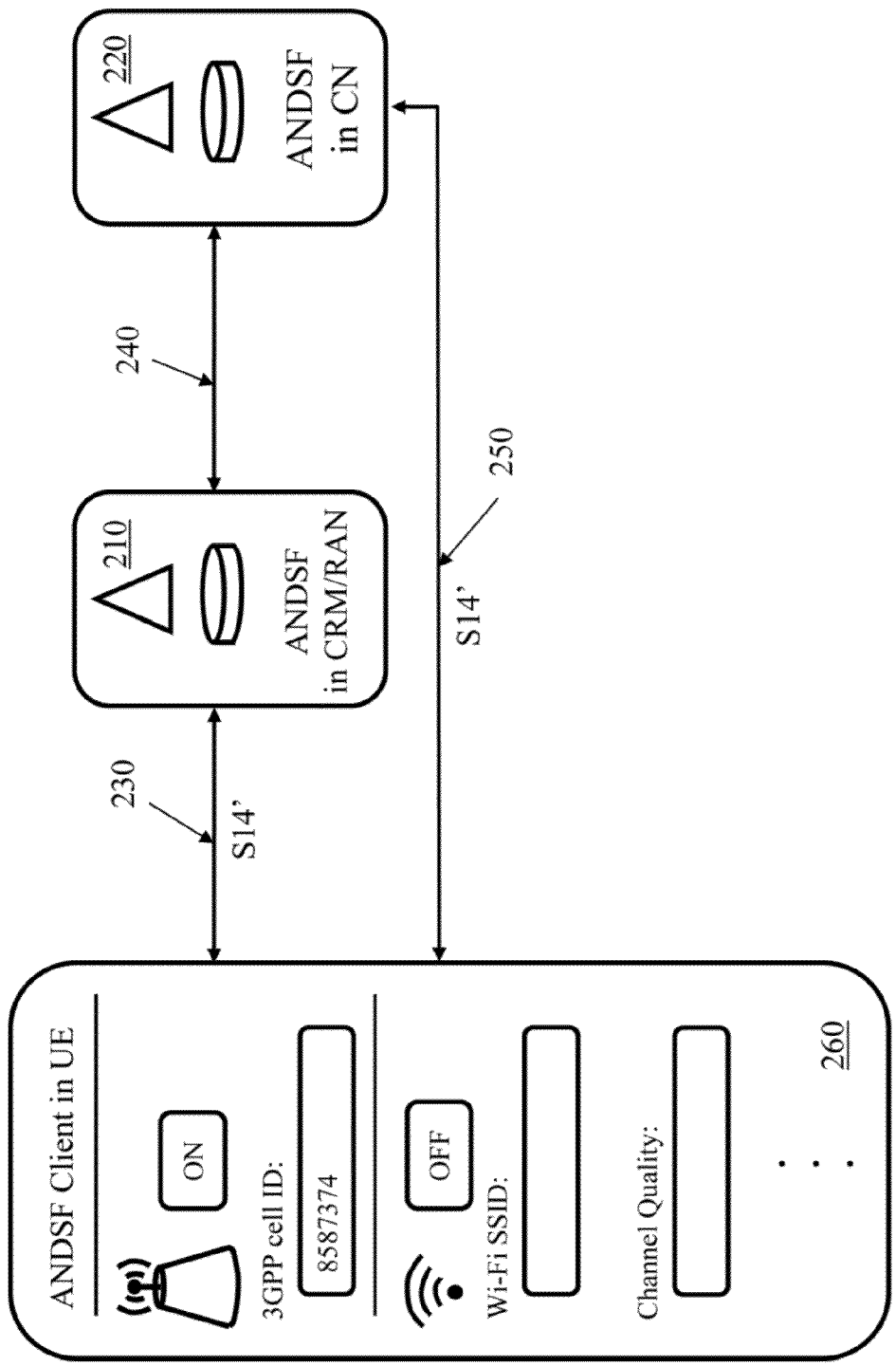
FIG. 2 illustrates a system level diagram showing an embodiment of the relationship between static access network discovery and selection function policies received over an enhanced S14' interface between an access network discovery and selection function server in a core network and a user equipment and dynamic policies received over an enhanced S14' interface between access network discovery and selection function server in a radio access network and a user equipment.

TABLE 1 basis service set ("BSS") load indication
channel utilization and stations attached
security
Level 2 ("L2") filtering, multicast management
operating class (e.g., dual band)
quality of experience ("QoE")
backhaul network bandwidth Turning now to FIG. 2, illustrated is a system level diagram showing an embodiment of the relationship between static ANDSF policies received over an enhanced S14' interface 250 between a CNA server 220 and a user equipment and dynamic policies received from an enhanced S14' interface 230 between a RANA server 210 and a user equipment. As illustrated in FIG. 2, a CNA server 220 is shown in a core network and a RANA server 210 is shown in a common resource manager ("CRM"). The CRM includes high-level solutions for network optimization and improved end user experience, enabling all the radio access technologies such as Wi-Fi and 3GPP to be seen as one common resource in terms of advanced traffic steering and service differentiation.

As illustrated in FIG. 2, the RANA server 210 in the CRM communicates with the CNA server 220 for coordination of policies over a communication link 240. The RANA server 210 in the CRM communicates with an ANDSF client 260 in a user equipment over an enhanced S14' interface 230. The communication with the ANDSF client 260 over the enhanced S14' interface 230 includes dynamic ANDSF signaling with near-real-time capabilities for a user equipment reporting information, and for information pushed (i.e., initiated) by the network back to the user equipment.

The CNA server 220 also communicates with the ANDSF client 260 over the enhanced S14' interface 250. When the CNA server 220 is not connected to the RANA server 210 in the CRM, it retrieves semi-static operator policies. The CNA server 220 also bootstraps (i.e., requests) information from the RANA server 210 in the CRM based on the user equipment's location. In this solution, dynamic policy can override a static policy as needed. This allows a flexible level of network control of the user equipment access selection that can minimize signaling when so needed (e.g., for stationary or inactive user equipment).

Some guidelines for the relationship between CNA server 220 and the RANA server 210 are set forth below. The ANDSF client 260 connects to the CNA server 220. Based on the user equipment's location, the CNA server 220 assigns the user equipment to a RANA server 210, if available. The CNA server 220 and RANA server 210 thus will have a master-delegate relationship wherein the CNA server 220 assumes the role of a master. Once the RANA server 210 takes over the user equipment, it has control of ANDSF policy information. The RANA server 210 queries the CNA server 220 to get other policy, location, etc., information, if needed. The CNA server 220 supports the same interfaces to other applications that are supported by the RAN A server 210.

The RANA server 210 employs the enhanced S14' interface 230 with the ANDSF client 260. The enhanced S14' interface includes all S14 interface elements and additional Hotspot 2.0 ("HS 2.0") information, which includes reporting of Wi-Fi RAT data. HS 2.0 is described in Hotspot 2.0 (Release 1) Technical Specification Version 1.0.0, dated May 7, 2012, which is incorporated herein by reference. Examples of Wi-Fi RAT data reportable over an enhanced S14' interface include a basis service set ("BSS") load indication, security information, quality of experience information, backhaul network bandwidth and average throughput.

Figure 3:
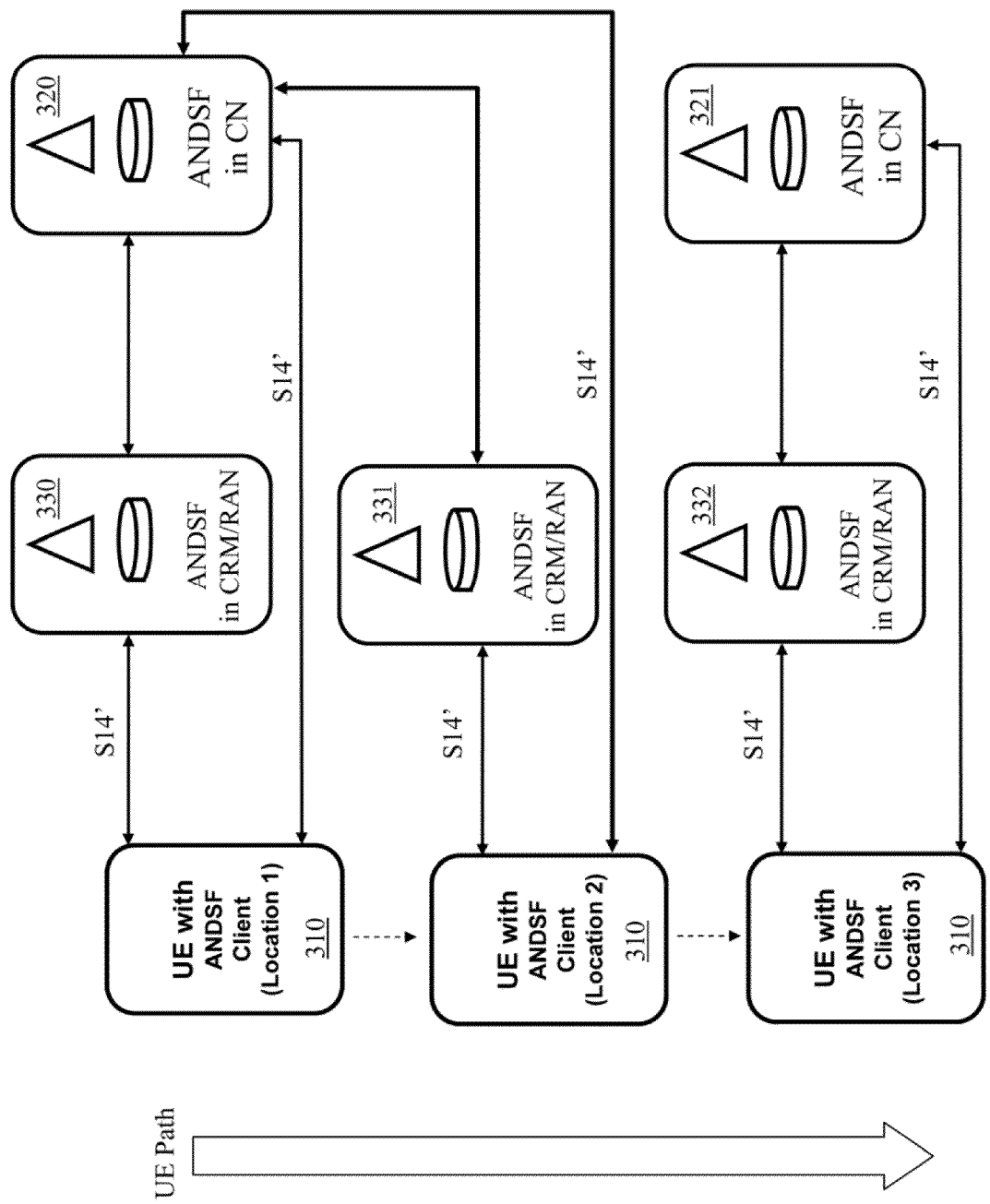
FIG. 3 illustrates a system level diagram showing an embodiment of an assignment of access network discovery and selection function servers in a core network and a radio access network for a user equipment.

Turning now to FIG. 3, illustrated is a system level diagram showing an embodiment of an assignment of CNA and RANA servers for a user equipment. Initially, the user equipment 310 is situated at "location 1" and is served by a CNA server 320 and RANA server 330. The CNA server 320, in this case, fulfills the master role while the RAN server 330 provides the delegate role. Once the user equipment 310 leaves the area served by RANA server 330 to "location 2" area that is served by a RANA server 331 and the CNA server 320, the user equipment 310 is handed over to the RANA server 331. Upon completion of this handover, the CNA server 320 retains the master role while the RANA server 331 is assigned the new delegate role. The user equipment 310 then leaves the MTSO area covered by the CNA server 320 and moves to a "location 3" which is served by the RANA server 332 and the CNA server 321. The user equipment 310 now has effectively moved to a new MTSO covered by the CNA server 321. In this case, the RANA server 331 first will hand the user equipment 310 off to the RANA server 332 and the RANA server 332 then will establish a master-delegate relationship with the CNA server 321. The CNA server 321 will assume the master role and the RANA server 332 will be assigned the delegate role.

Figure 4:
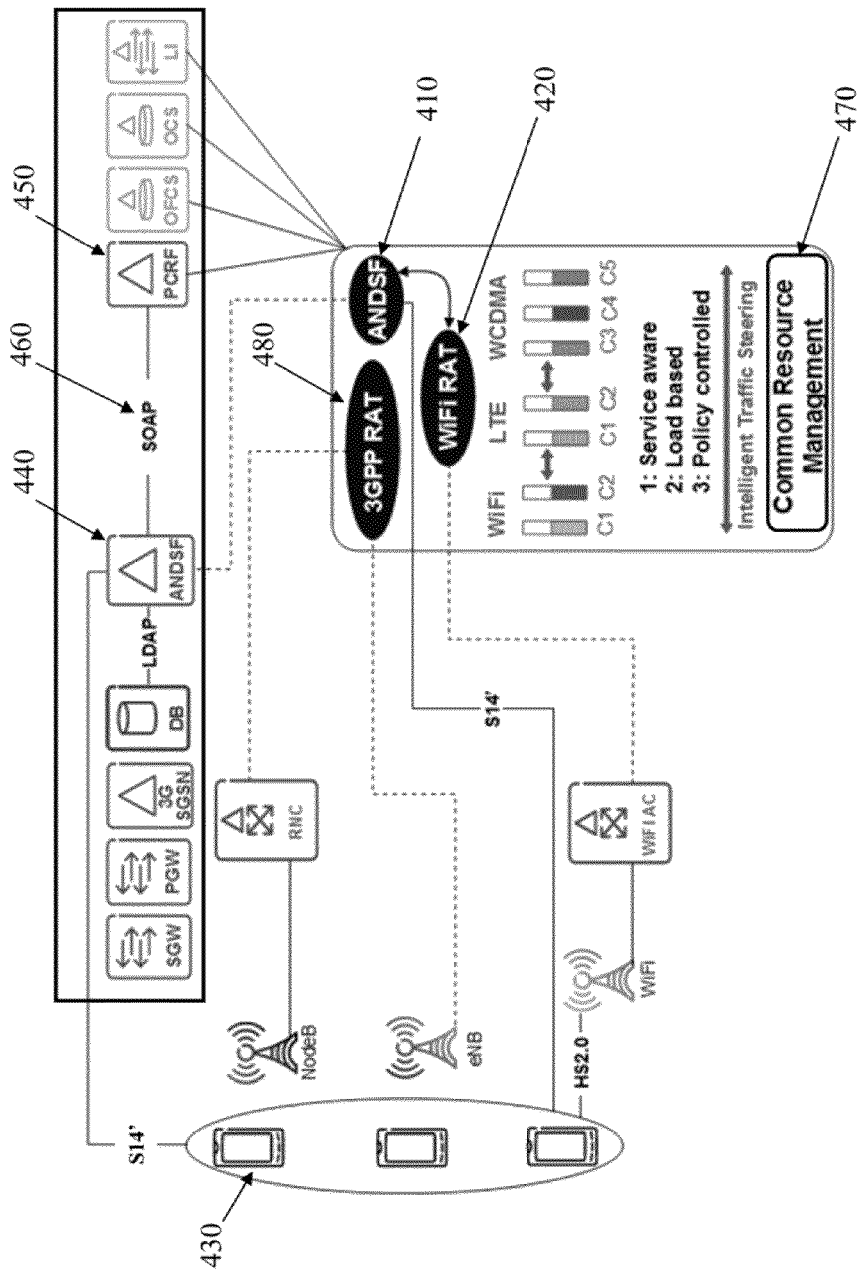
FIG. 4 illustrates a system level diagram showing further details of an embodiment of the network architecture.

Turning now to FIG. 4, illustrated is a system level diagram showing further details of an embodiment of the network architecture. A RANA server 410 is connected over an interface to a Wi-Fi RAT 420 to collect relevant parameters for making an informed access selection decision for a UE 430. The RANA server 410 is connected to the UE 430 via an enhanced S14' interface as described herein. A CNA server 440 is connected to a policy and charging rules function ("PCRF") 450 via a simple object access protocol ("SOAP") interface 460. However, the protocol shown by PCRF 450 can be based on any other web services ("WS") and/or representational state transfer ("REST") interfaces. A CRM 470 is connected to each RAT (e.g., the Wi-Fi RAT 420 and a 3GPP RAT 480) to have access to their instantaneous load information.

A result of this network architecture is improved use of valuable radio access network resources with minimum impact on a user equipment battery life. Load, service, and policy can be based on informed traffic steering. A distributed ANDSF arrangement provides a scalable architecture that is fully ANDSF compliant.

Figure 5:
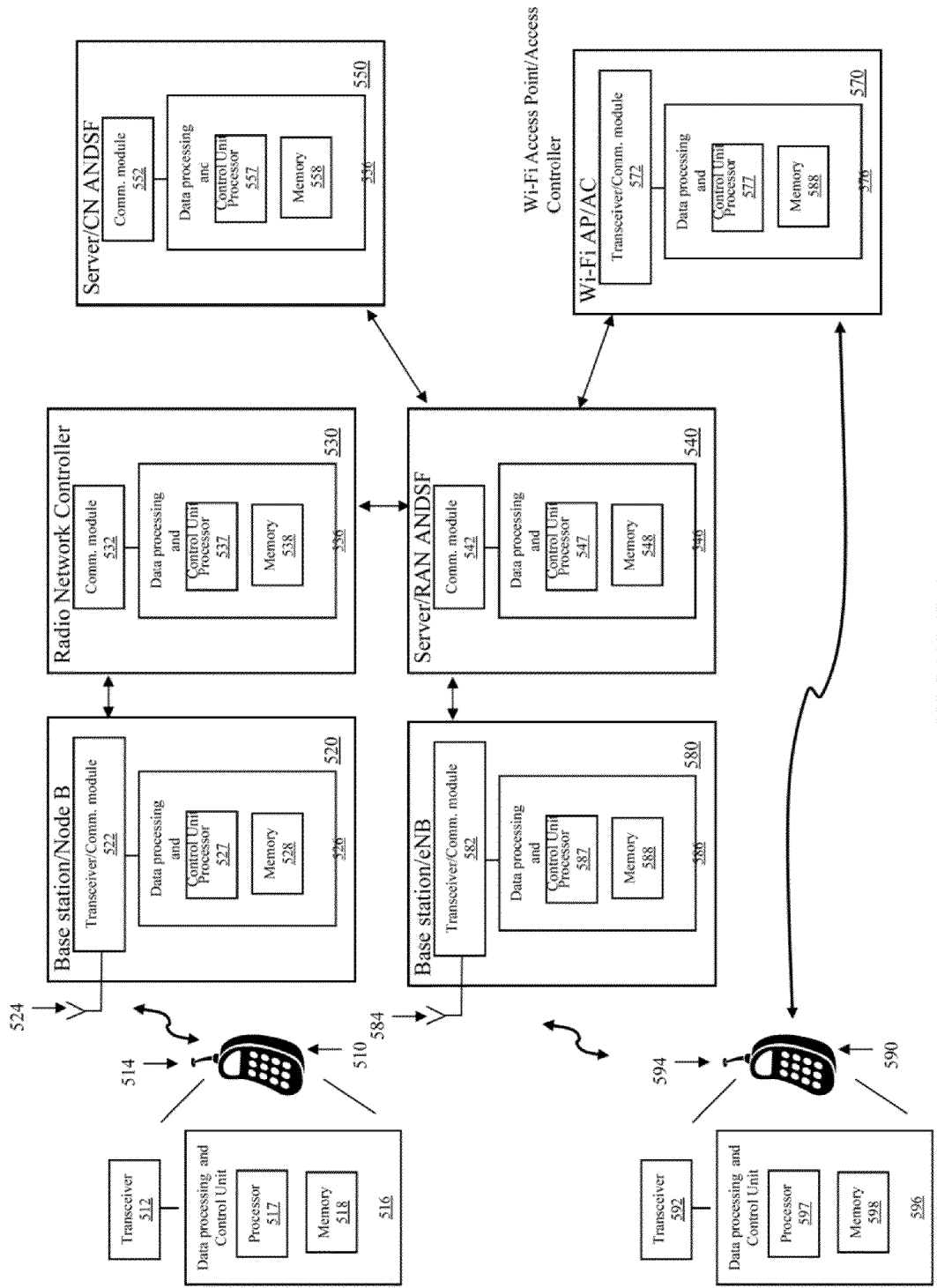
FIG. 5 illustrates a system level diagram of an embodiment of a communication system including a system for providing an access network discovery and selection function.

Turning now to FIG. 5, illustrated is a system level diagram of an embodiment of a communication system including a system for providing an access network discovery and selection function. The communication system may form a portion of a cellular radio access network and includes a first user equipment 510 communicating wirelessly and bidirectionally with a first base station 520 coupled to a radio network controller 530. The radio network controller 530 is coupled, in turn, to a RANA server 540 in a 3GPP radio access network. The RANA server 540 is coupled to a CNA server 550 in a core network. The RANA server 540 is also coupled to a Wi-Fi access point/access controller 570 that provides Wi-Fi access for the first user equipment 510 and a second user equipment 590. The second user equipment 590 is also coupled by a bidirectional wireless cellular communication path to a second base station 580 that is coupled to the RANA server 540. For the coupling between the RANA server 540 and the second base station 580, and between the RANA server 540 and the radio network controller 530, the respective RANA server 540 may be logically coupled on an SGi-interface, or the RANA server 540 can intercept communication by some means below an SGi-interface. The SGi interface is described in 3GPP Technical Specification 29.061 V12.0.0, dated December 2012, which is incorporated herein by reference.

The first user equipment 510 and the second user equipment 590 are each formed with a transceiver 512, 592, respectively, coupled to an antenna 514, 594, respectively. Of course, multiple antennas may be employed to advantage. The first user equipment 510 and the second user equipment 590 include a data processing and control unit 516, 596 respectively, formed with a processor 517, 597, respectively, coupled to a memory 518, 598, respectively. Of course, the first user equipment 510 and the second user equipment 590 include other elements such as a keypad, a display, interface devices, etc. The first user equipment 510 and the second, user equipment 590 are generally a self-contained wireless communication device intended to be carried by an end user (e.g., subscriber stations, terminals, mobile stations, machines, or the like).

The first base station 520 and the second base station 580 are formed with a transceiver/communication module 522, 582, respectively, coupled to an antenna 524, 584, respectively. Of course, multiple antennas may be employed to advantage. Also, the transceiver/communication modules 522, 582 are configured for wireless and wired communication. The first base station 520 and the second base station 580 may provide point-to-point and/or point-to-multipoint communication services. The first base station 520 and the second base station 580 include a data processing and control unit 526, 586, respectively, formed with a processor 527, 587, respectively, coupled to a memory 528, 588, respectively. Of course, the first base station 520 and the second base station 580 include other elements such as interface devices, etc.

The first base station 520 and the second base station 580 may host functions such as radio resource management. For instance, the first base station 520 and the second base station 580 may perform functions such as internet protocol ("IP") header compression and encryption of user data streams, ciphering of user data streams, radio bearer control, radio admission control, connection mobility control, dynamic allocation of communication resources to the first user equipment 510 and the second user equipment 590 in both the uplink and the downlink, and measurement and reporting configuration for mobility and scheduling.

The radio network controller 530, the RANA server 540 and the CNA server 550 are formed with communication modules 532, 542, 552, respectively. The radio network controller 530, the RANA server 540 and the CNA server 550 also include data processing and control units 536, 546, 556, respectively, formed with processors 537, 547, 557, respectively, coupled to corresponding memories 538, 548, 558. Of course, the radio network controller 530, the RANA server 540 and CNA server 550 include other elements such as interface devices, etc. The radio network controller 530 generally provides access to a telecommunication network such as a public service telecommunications network ("PSTN"). Access may be provided using fiber optic, coaxial, twisted pair, microwave communications, or similar link coupled to an appropriate link-terminating element. The RANA server 540 and CNA server 550 can be hosted, without limitation, by a service provider that provides cloud computing over the World Wide Web and may be external to the communication systems of the service provider.

The data processing and control units identified above provide digital processing functions for controlling various operations required by the respective unit in which it operates, such as radio and data processing operations to conduct bidirectional communications between base stations, radio network controllers and access points, and a respective user equipment. The processors in the data processing and control units are each coupled to memory that stores programs and data of a temporary or more permanent nature.

The processors in the data processing and control units, which may be implemented with one or a plurality of processing devices, performs functions associated with its operation including, without limitation, precoding of antenna gain/phase parameters, encoding and decoding of individual bits forming a communication message, formatting of information and overall control of a respective communication element. Exemplary functions related to management of communication resources include, without limitation, hardware installation, traffic management, performance data analysis, configuration management, security, billing and the like. The processors in the data processing and control units may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The memories in the data processing and control units may be one or more memories and of any type suitable to the local application environment, and may be implemented using any suitable volatile or nonvolatile data storage technology such as a semiconductor-based memory device, a magnetic memory device and system, an optical memory device and system, fixed memory and removable memory. The programs stored in the memories may include program instructions or computer program code that, when executed by an associated processor, enable the respective communication element to perform its intended tasks. Of course, the memories may form a data buffer for data transmitted to and from the same. In the case of the user equipment, the memories may store applications (e.g., virus scan, browser, and games) for use by the same. Exemplary embodiments of the system, subsystems, and modules as described herein may be implemented, at least in part, by computer software executable by processors of the data processing and control units, or by hardware, or by combinations thereof.

The transceivers modulate information onto a carrier waveform for transmission by the respective communication element via the respective antenna(s) to another communication element. The respective transceiver demodulates information received via the antenna(s) for further processing by other communication elements. The transceiver is capable of supporting duplex operation for the respective communication element. The communication modules further facilitate the bidirectional transfer of information between communication elements.

The RANA server 540 and/or the CNA server 550 are operable with a 3GPP radio access network and a Wi-Fi radio access network coupled to a core network. The processor 547, 557 in accordance with the memory 548, 558 of the RANA server 540 and/or the CNA server 550, respectively, are configured to communicate with a user equipment over an enhanced S14 interface. The enhanced S14 interface comprises Wi-Fi radio access technology data including a basis service set ("BSS") load indication, security information, quality of experience information, backhaul network bandwidth and average throughput. The processor 547, 557 in accordance with the memory 548, 558 of the RANA server 540 and/or the CNA server 550, respectively, are also configured to provide policy information to the user equipment based on conditions in the Wi-Fi radio access network and the 3GPP radio access network. As discussed herein, the processor 547, 557 in accordance with the memory 548, 558 of the RANA server 540 and/or the CNA server 550, respectively, are also configured to perform other actions or functions in the communication system.

The first user equipment 510 and/or the second user equipment 590 are operable with a 3GPP radio access network and a Wi-Fi radio access network coupled to a core network. The processor 517, 597 in accordance with the memory 518, 598 of the first user equipment 510 and/or the second user equipment 590, respectively, are configured to provide a location thereof to the CNA server 550 in the core network. The processor 517, 597 in accordance with the memory 518, 598 of the first user equipment 510 and/or the second user equipment 590, respectively, are also configured to communicate with the RANA server 540 or the CNA server 550 over an enhanced S14 interface. The enhanced S14 interface comprises Wi-Fi radio access technology data including a basis service set ("BSS") load indication, security information, quality of experience information, backhaul network bandwidth and average throughput. The processor 517, 597 in accordance with the memory 518, 598 of the first user equipment 510 and/or the second user equipment 590, respectively, are also configured to receive policy information from the RANA server 540 or the CNA server 550 based on conditions in the Wi-Fi radio access network and the 3GPP radio access network. As discussed herein, the processor 517, 597 in accordance with the memory 518, 598 of the first user equipment 510 and/or the second user equipment 590, respectively, are also configured to perform other actions or functions in the communication system.

Figure 6:
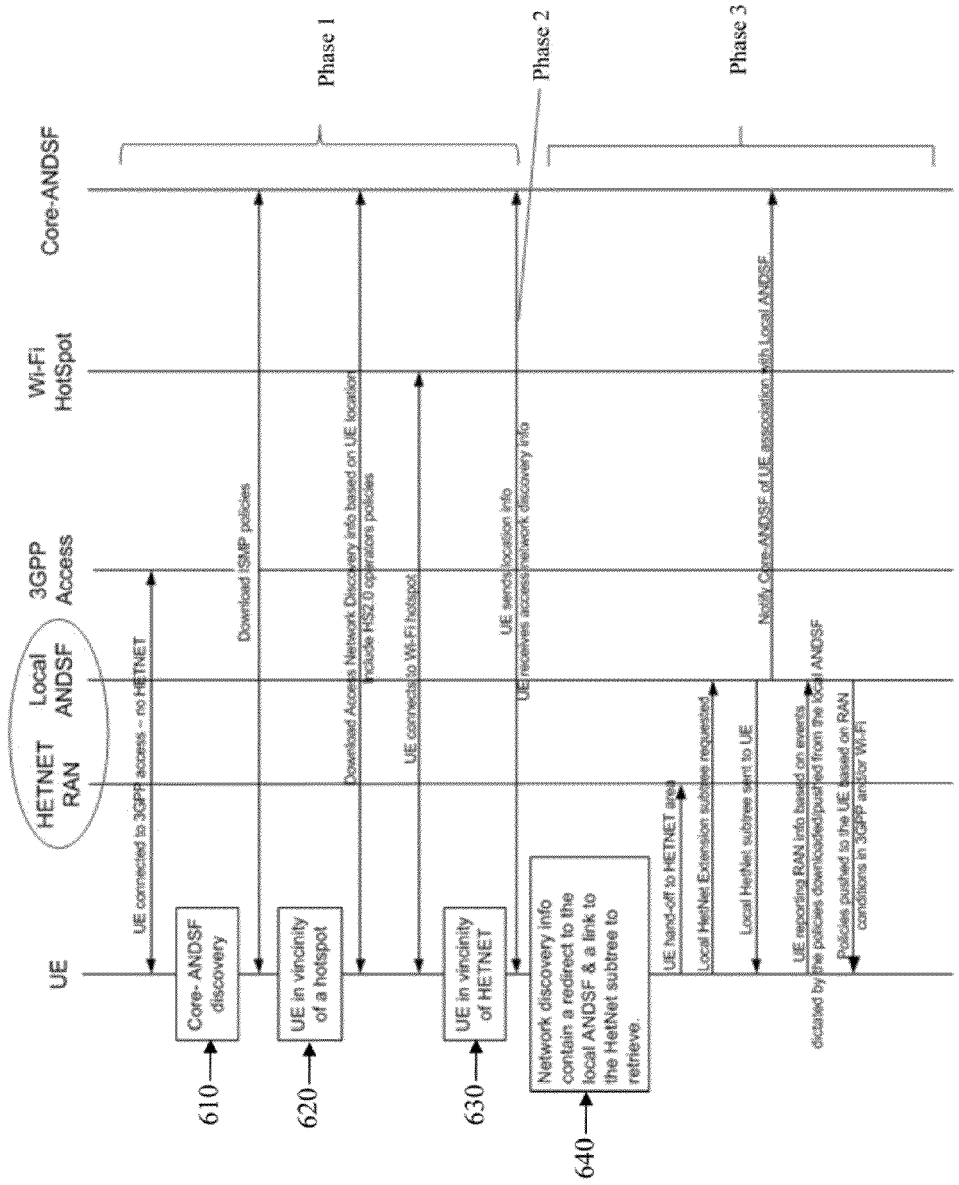
FIG. 6, illustrated is a diagram showing an exemplary signaling flow to perform an access network discovery and selection function.

Turning now to FIG. 6, illustrated is a diagram showing an exemplary signaling flow to perform an access network discovery and selection function. In particular, an ANDSF server in a core network (a CNA server or core-ANDSF) provides information to a user equipment (designated "UE") including an ANDSF client on how to select an ANDSF server in a radio access network (a RANA server or local ANDSF). The user equipment is in a coverage area of a heterogeneous network ("HETNET") RAN including the local ANDSF, a 3GPP radio access network or access point, a Wi-Fi radio access network or hotspot and the core-ANDSF. A first phase of messaging provides ANDSF intersystem mobility policy ("ISMP") and network discovery subtree retrieval. A second phase of messaging communicates a reception of information on the HETNET. The messaging indicates a unified resource name ("URN") address/link and the local ANDSF address. The ANDSF client on the user equipment then connects to the local ANDSF and retrieves the heterogeneous subtree. The third phase of messaging indicates that the local ANDSF takes over. The locally downloaded heterogeneous network subtree contains policies for the user equipment. The local ANDSF sends near real-time information to the user equipment including steering commands based on 3GPP and Wi-Fi RAN conditions. The user equipment can report back RAN parameters to the local ANDSF.

Initially, the local ANDSF is connected to the 3GPP access point, without HETNET capability. In a block 610, the local ANDSF accesses the core-ANDSF over an S14 interface, from which ISMP policies are downloaded. In a block 620, the user equipment enters the coverage area of a Wi-Fi hotspot. The user equipment then downloads access network directory information based on its location, including HS 2.0 operator policies. The user equipment then connects to the Wi-Fi hotspot. In a block 630, the user equipment enters the coverage area of a HETNET. The user equipment sends its location information to the core-ANDSF and, in response, receives the access network directory information. In a block 640, the user equipment employs network discovery information containing a redirect to the local ANDSF and a link to a HETNET subtree to retrieve further information. The user equipment is then handed off to the HETNET, and requests a local HETNET extension subtree. The local ANDSF transmits the local HETNET extension subtree to the user equipment and notifies the core-ANDSF of the user equipment's association with the local ANDSF. The user equipment reports RAN information to the local ANDSF based on events dictated by the policies downloaded from the local ANDSF. The local ANDSF then pushes policies to the user equipment based on RAN conditions in the 3GPP access point and/or the Wi-Fi hotspot.

Figure 7:
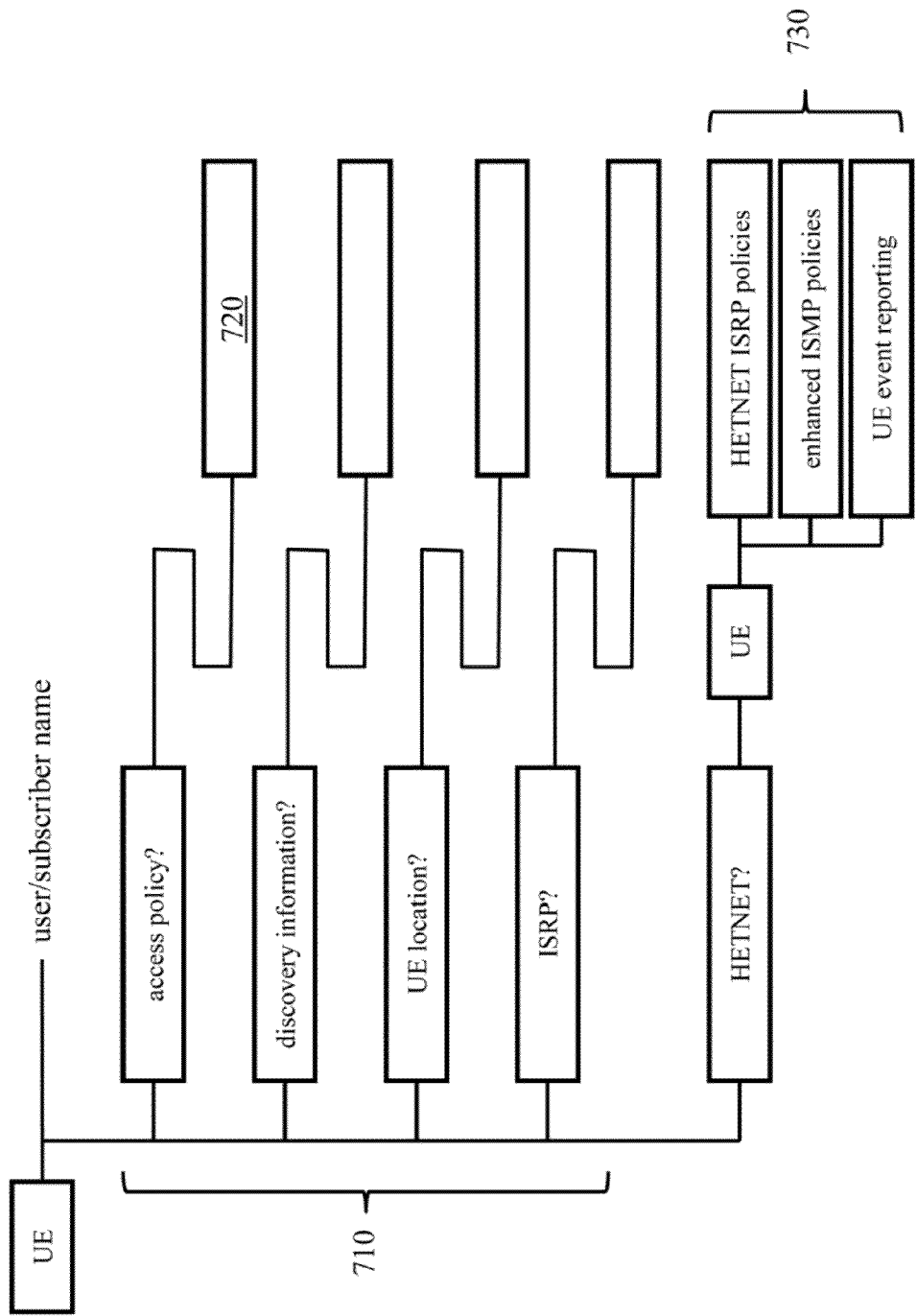
FIG. 7 illustrates a diagram showing an embodiment of how an access network discovery and selection function-managed object can be updated with information enabling dynamic steering as well as bootstrapping.

Turning now to FIG. 7, illustrated is a diagram showing an embodiment of how an ANDSF-managed object (a user equipment ("UE")) can be updated with information enabling dynamic steering as well as bootstrapping (i.e., when a CNA server provides information about a RANA server to the user equipment). A plurality of tree entries 710 are populated by the CNA server. The subtree entries, such as subtree entry 720, contain, information about HETNET networks in addition to regular Wi-Fi radio access network policies. For example, the subtree entries 720 can be populated with the user equipment location and bootstrap information associated with the HETNET definition. A plurality of HETNET subtrees 730 are populated by the RANA server. The HETNET subtrees 730 optionally contain ISRP information and contain enhanced ISMP policies providing near-real-time updates to the user equipment. The user equipment event reporting internal node is populated by the user equipment with event-based reporting of RAN parameters.

Thus, as introduced herein, the ANDSF policy is efficiently signaled, which enables optimizing network performance taking into account access network load status of 3GPP and non-3GPP accesses (e.g., UTRAN, E-UTRAN, Wi-Fi). Policy consistency can be maintained due to the flexible master-delegate architecture between the CNA and RANA. Value added use cases are enabled as a result of combining policy-event triggers from User Profile and PCRF.

Figure 8:
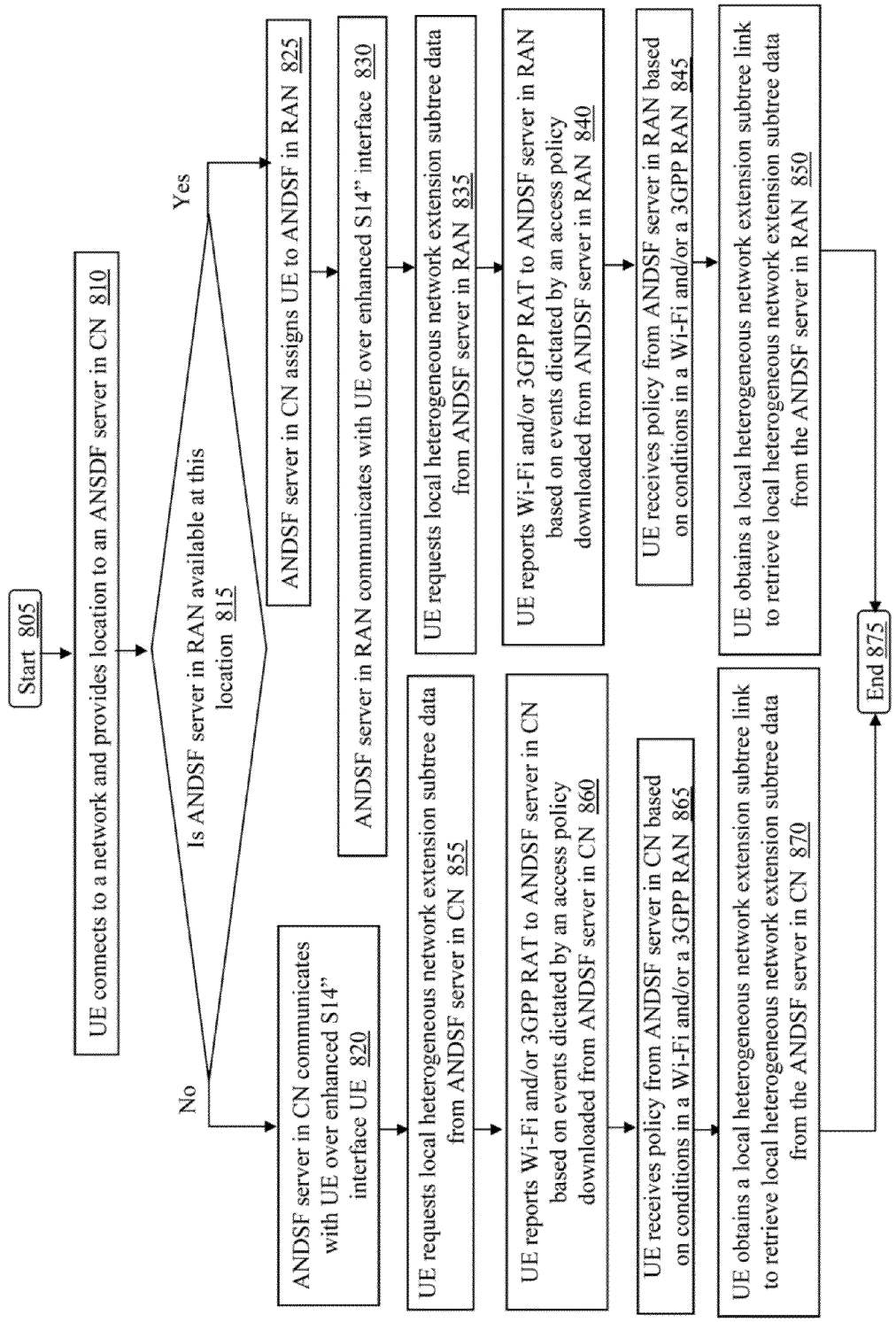
FIG. 8 illustrates a flow diagram of an embodiment of a method of performing an access network discovery and selection function in a user equipment.

Turning now to FIG. 8, illustrated is a flow diagram of an embodiment of a method of performing an ANDSF in a user equipment operable with a 3GPP radio access network and a Wi-Fi radio access network coupled to a core network. The method begins in a start step or module 805. In a step or module 810, the UE connects wirelessly to a network and provides a location to an ANDSF server in the core network (("CN"), also referred to as a CNA server). In a step or module 815, the user equipment determines if an ANDSF server in its radio access network (("RAN"), also referred to as a RANA server) is available at this location. If so, in a step or module 825 the ANDSF server in the core network assigns the user equipment to the ANDSF server in its radio access network. In a step or module 830, the ANDSF server in its radio access network communicates with the user equipment over an enhanced S14' interface.

In a step or module 835, the user equipment requests local heterogeneous network extension subtree data from the ANDSF server in its radio access network. In a step or module 840, the user equipment reports Wi-Fi and/or 3GPP radio access technology to the ANDSF server in the radio access network based on events dictated by an access policy downloaded from the ANDSF server in the radio access network. In a step or module 845, the user equipment receives policy from the ANDSF server in the radio access network based on conditions in the Wi-Fi and/or the 3GPP radio access network. In a step or module 850, the user equipment obtains a local heterogeneous network extension subtree link to retrieve local heterogeneous network extension subtree data from the ANDSF server in the radio access network. The method then ends in a step or module 875.

If in the step or module 815 the user equipment determines an ANDSF server in its radio access network is not available at this location, the method continues in a step or module 820. In the step or module 820, the ANDSF server in the core network communicates with the user equipment over an enhanced S14' interface. In a step or module 855, the user equipment requests local heterogeneous network extension subtree data from the ANDSF server in the core network. In a step or module 860, the user equipment reports Wi-Fi and/or 3GPP radio access technology to the ANDSF server in the core network based on events dictated by access policy downloaded from the ANDSF server in the core network. In a step or module 865, the user equipment receives policy from the ANDSF server in the core network based on conditions in a Wi-Fi and/or a 3GPP radio access network. In a step or module 870 the user equipment obtains a local heterogeneous network extension subtree link to retrieve local heterogeneous network extension subtree data from the ANDSF server in the core network. The method ends at the step or module 875.

Figure 9:
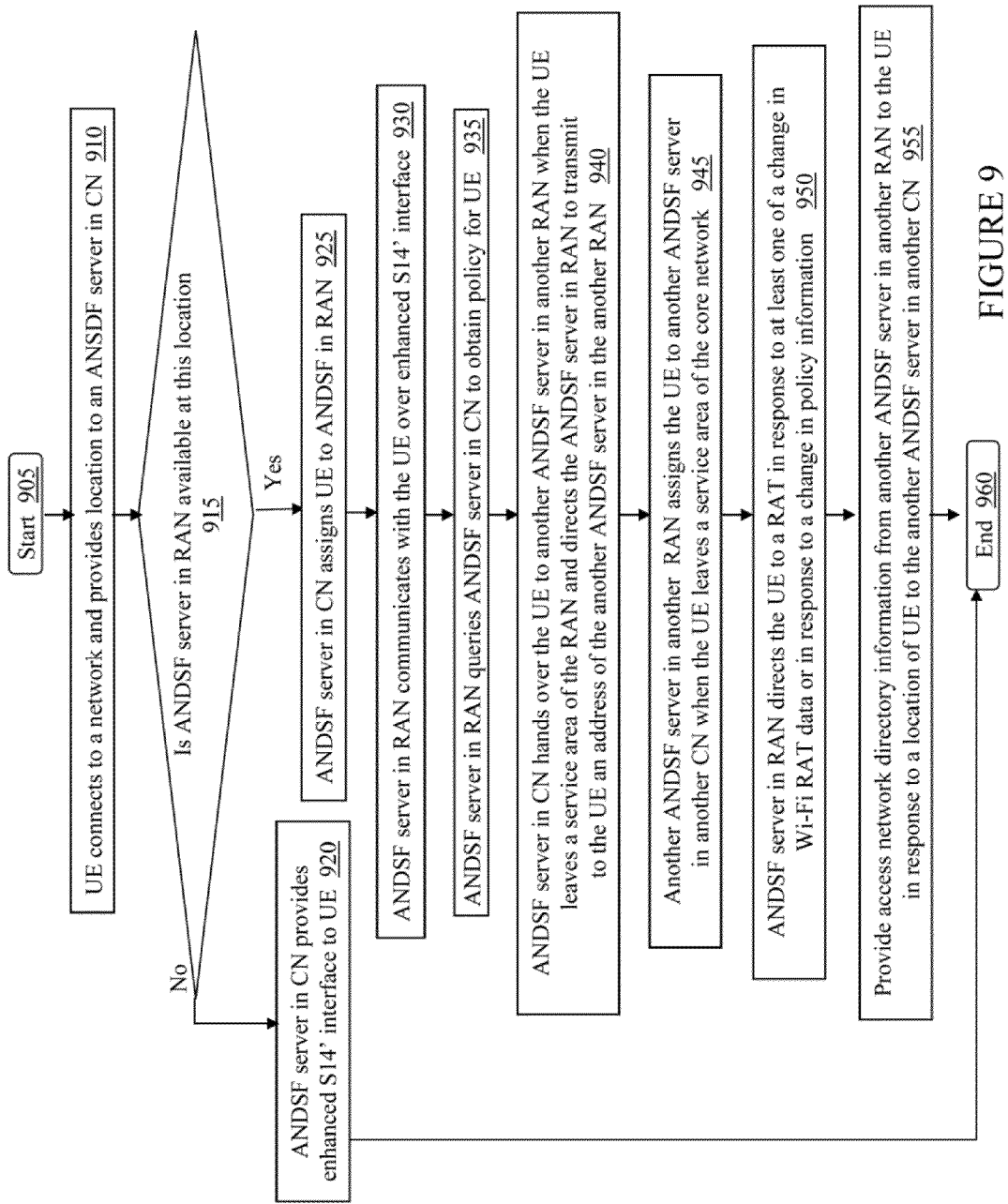
FIG. 9 illustrates a flow diagram of an embodiment of a method of performing an access network discovery and selection function in an access network discovery and selection function server.

Turning now to FIG. 9, illustrated is a flow diagram of an embodiment of a method of performing an ANDSF in an ANDSF server operable with a 3GPP radio access network and a Wi-Fi radio access network coupled to a core network. The method begins in a start step or module 905. In a step or module 910, a user equipment connects to a network and provides location to an ANDSF server in a core network. In a step or module 915, the ANDSF server checks if an ANDSF server in a radio access network is available at this location. If so, in a step or module 925 the ANDSF server in the core network assigns the user equipment to the ANDSF server in the radio access network. In a step or module 930, the ANDSF server in the radio access network communicates with the user equipment over an enhanced S14' interface.

In a step or module 935, the ANDSF server in the radio access network queries the ANDSF server in the core network to obtain policy for the user equipment. In a step or module 940, the ANDSF server in the core network hands over the user equipment to another ANDSF server in another radio access network when the user equipment leaves a service area of the radio access network and directs the ANDSF server in the radio access network to transmit to the user equipment an address of the another ANDSF server and the another radio access network. In a step or module 945, the another ANDSF server in the another radio access network assigns the user equipment to the another ANDSF server in the another core network when the user equipment leaves a service area of the core network. In a step or module 950, the ANDSF server in the radio access network directs the user equipment to a radio access technology in response to at least one of change in Wi-Fi radio access technology data or in response to change in policy information. In a step or module 955, access network directory information is provided from the another ANDSF server in the another radio access network to the user equipment in response to location of the user equipment to the another ANDSF server in the another core network. The method ends in a step or module 960.

If in step or module 915 the ANDSF server in the radio access network is not available at this location, the method proceeds to a step or module 920. In the step or module 920, the ANDSF server in the core network communicates with the user equipment over an enhanced S14' interface. The method then ends in the step or module 960.

Program or code segments making up the various embodiments may be stored in a computer readable medium or transmitted by a computer data signal embodied in a carrier wave, or a signal modulated by a carrier, over a transmission medium. For instance, a computer program product including a program code stored in a computer readable medium (e.g., a non-transitory computer readable medium) may form various embodiments. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. A method for performing an access network discovery and selection function ("ANDSF") in a user equipment operable with a Third Generation Partnership Project ("3GPP") radio access network and a Wireless Fidelity ("Wi-Fi") radio access network coupled to a core network, comprising:
    providing a location of said user equipment to an ANDSF server in said core network;
    reporting Wi-Fi radio access technology data from the user equipment to one of a plurality of ANDSF servers in said 3GPP radio access network over an enhanced S14 interface,
    said user equipment being assigned by said ANDSF server in said core network to said one of a plurality of ANDSF servers in said 3GPP radio access network based on the location of said user equipment, and
    said Wi-Fi radio access technology data including a basis service set ("BSS") load indication, security information, quality of experience information, backhaul network bandwidth and average throughput;
    requesting local heterogeneous network extension subtree data from said ANDSF server in said 3GPP radio access network or said ANDSF server in said core network; and
    receiving policy information from said ANDSF server in said 3GPP radio access network based on conditions in said Wi-Fi radio access network and said 3GPP radio access network.

2. The method as recited in claim 1 wherein said Wi-Fi radio access technology data further includes at least one of channel utilization, user equipment attached to said Wi-Fi radio access network, a channel quality indicator and an operating band class.

3. The method as recited in claim 1 further comprising reporting 3GPP radio access technology data to said ANDSF server in said 3GPP radio access network or said ANDSF server in said core network.

4. The method as recited in claim 1 further comprising obtaining a local heterogeneous network extension subtree link to retrieve local heterogeneous network extension subtree data from said ANDSF server in said 3GPP radio access network or said ANDSF server in said core network.

5. The method as recited in claim 1 further comprising receiving semi-static operator policy information when said ANDSF server in said core network is not connected to said ANDSF server in said 3GPP radio access network.

6. The method as recited in claim 1 further comprising providing said location of said user equipment to another ANDSF server in another core network and receiving an address of another ANDSF server in another 3GPP radio access network in response thereto.

7. The method as recited in claim 1 further comprising providing said location of said user equipment to another ANDSF server in another core network and receiving access network directory information from another ANDSF server in another 3GPP radio access network in response thereto.

8. A user equipment operable with a Third Generation Partnership Project ("3GPP") radio access network and a Wireless Fidelity ("Wi-Fi") radio access network coupled to a core network, comprising:
   a processor; and
   memory including computer program code, said memory and said computer program code configured to, with said processor, cause said user equipment to perform at least the following:
      provide a location of said user equipment to an access network discovery and selection function ("ANDSF") server in said core network;
      report Wi-Fi radio access technology data from the user equipment to one of a plurality of ANDSF servers in said 3GPP radio access network over an enhanced S14 interface,
      said user equipment being assigned by said ANDSF server in said core network to said one of a plurality of ANDSF servers in said 3GPP radio access network, and
      said Wi-Fi radio access technology data including a basis service set ("BSS") load indication, security information, quality of experience information, backhaul network bandwidth and average throughput;
      request local heterogeneous network extension subtree data from said ANDSF server in said 3GPP radio access network or said ANDSF server in said core network; and
      receive policy information from said ANDSF server in said 3GPP radio access network based on conditions in said Wi-Fi radio access network and said 3GPP radio access network.

9. The user equipment as recited in claim 8 wherein said Wi-Fi radio access technology data further includes at least one of channel utilization, user equipment attached to said Wi-Fi radio access network, a channel quality indicator and an operating band class.

10. The user equipment as recited in claim 8 wherein said memory and said computer program code are further configured to, with said processor, cause said user equipment to report 3GPP radio access technology data to said ANDSF server in said 3GPP radio access network or said ANDSF server in said core network.

11. The user equipment as recited in claim 8 wherein said memory and said computer program code are further configured to, with said processor, cause said user equipment to obtain a local heterogeneous network extension subtree link to retrieve local heterogeneous network extension subtree data from said ANDSF server in said 3GPP radio access network or said ANDSF server in said core network.

12. The user equipment as recited in claim 8 wherein said memory and said computer program code are further configured to, with said processor, cause said user equipment to receive semi-static operator policy information when said ANDSF server in said core network is not connected to said ANDSF server in said 3GPP radio access network.

13. The user equipment as recited in claim 8 wherein said memory and said computer program code are further configured to, with said processor, cause said user equipment to provide said location of said user equipment to another ANDSF server in another core network and receive an address of another ANDSF server in another 3GPP radio access network in response thereto.

14. The user equipment as recited in claim 8 wherein said memory and said computer program code are further configured to, with said processor, cause said user equipment to provide said location of said user equipment to another ANDSF server in another core network and receive access network directory information from another ANDSF server in another 3GPP radio access network in response thereto.

15. A method for operating an access network discovery and selection function ("ANDSF") server operable with a Third Generation Partnership Project ("3GPP") radio access network and a Wireless Fidelity "Wi-Fi") radio access network coupled to a core network, comprising:
   receiving a report including Wi-Fi radio access technology data from a user equipment over an enhanced S14 interface,
   said user equipment being assigned by an ANDSF server in said core network to said ANDSF server in said 3GPP radio access network based on a location of said user equipment provided to said ANDSF server in said core network,
   said Wi-Fi radio access technology data including a basis service set "BSS") load indication, security information, quality of experience information, backhaul network bandwidth and average throughput;
   receiving a request for local heterogeneous network extension subtree data from said user equipment; and
   providing policy information to said user equipment based on conditions in said Wi-Fi radio access network and said 3GPP radio access network.

16. The method as recited in claim 15 wherein said Wi-Fi radio access technology data further includes at least one of channel utilization, user equipment attached to said Wi-Fi radio access network, a channel quality indicator and an operating band class.

17. The method as recited in claim 15 further comprising receiving a report including 3GPP radio access technology data from said user equipment.

18. The method as recited in claim 15 further comprising providing a local heterogeneous network extension subtree link to said user equipment to enable said user equipment to retrieve local heterogeneous network extension subtree data.

19. The method as recited in claim 15 wherein said ANDSF server is located in said 3GPP radio access network and is assigned to said user equipment by an ANDSF server in said core network.

20. The method as recited in claim 15 wherein said ANDSF server is located in said 3GPP radio access network and the method further comprises querying an ANDSF server in said core network for said policy information for said user equipment.

21. The method as recited in claim 15 wherein said ANDSF server is located in said 3GPP radio access network and the method further comprises providing an address of another ANDSF server in another 3GPP radio access network to said user equipment, said another ANDSF server in said another 3GPP radio access network assigning said user equipment to another ANDSF server in another core network.

22. The method as recited in claim 15 wherein said ANDSF server is located in said 3GPP radio access network and the method further comprises directing said user equipment to a Wi-Fi radio access technology or 3GPP radio access technology in response to a change in a condition associated with said Wi-Fi radio access technology data or change in said policy information.

23. An access network discovery and selection function ("ANDSF") server operable with a Third Generation Partnership Project ("3GPP") radio access network and a Wireless Fidelity ("Wi-Fi") radio access network coupled to a core network, comprising:
   a processor; and memory including computer program code, said memory and said computer program code configured to, with said processor, cause said ANDSF server to perform at least the following:

receive a report including Wi-Fi radio access technology data from a user equipment over an enhanced S14 interface, said user equipment being assigned by an ANDSF server in said core network to said ANDSF server in said 3GPP radio access network based on a location of said user equipment provided to said ANDSF server in said core network, said Wi-Fi radio access technology data including a basis service set ("BSS") load indication, security information, quality of experience information, backhaul network bandwidth and average throughput receive a request for local heterogeneous network extension subtree data from said user equipment; and provide policy information to said user equipment based on conditions in said Wi-Fi radio access network and said 3GPP radio access network.

24. The ANDSF server as recited in claim 23 wherein said Wi-Fi radio access technology data further includes at least one of channel utilization, user equipment attached to said Wi-Fi radio access network, a channel quality indicator and an operating band class.

25. The ANDSF server as recited in claim 23 wherein said memory and said computer program code are further configured to, with said processor, cause said ANDSF server to receive a report including 3GPP radio access technology data from said user equipment.

26. The ANDSF server as recited in claim 23 wherein said memory and said computer program code are further configured to, with said processor, cause said ANDSF server to provide a local heterogeneous network extension subtree link to said user equipment to enable said user equipment to retrieve local heterogeneous network extension subtree data.

27. The ANDSF server as recited in claim 23 wherein said ANDSF server is located in said 3GPP radio access network and is assigned to said user equipment by an ANDSF server in said core network.

28. The ANDSF server as recited in claim 23 wherein said ANDSF server is located in said 3GPP radio access network and said memory and said computer program code are further configured to, with said processor, cause said ANDSF server to query an ANDSF server in said core network for said policy information for said user equipment.

29. The ANDSF server as recited in claim 23 wherein said ANDSF server is located in said 3GPP radio access network and said memory and said computer program code are further configured to, with said processor, cause said ANDSF server to provide an address of another ANDSF server in another 3GPP radio access network to said user equipment, said another ANDSF server in said another 3GPP radio access network assigning said user equipment to another ANDSF server in another core network.

30. The ANDSF server as recited in claim 23 wherein said ANDSF server is located in said 3GPP radio access network and said memory and said computer program code are further configured to, with said processor, cause said ANDSF server to direct said user equipment to a Wi-Fi radio access technology or 3GPP radio access technology in response to a change in a condition associated with said Wi-Fi radio access technology data or change in said policy information.

* * * * *